US010044813B2

(12) United States Patent
Yoon et al.

(10) Patent No.: US 10,044,813 B2
(45) Date of Patent: Aug. 7, 2018

(54) FAILOVER AND LIVE MIGRATION OF ZERO/THIN CLIENTS

(71) Applicant: AMERICAN MEGATRENDS, INC., Norcross, GA (US)

(72) Inventors: David Yoon, Chamblee, GA (US); Jayachandran Gnanasekaran, Duluth, GA (US); Yugender P. Subramanian, Norcross, GA (US); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 251 days.

(21) Appl. No.: 15/079,296

(22) Filed: Mar. 24, 2016

(65) Prior Publication Data
US 2017/0279900 A1    Sep. 28, 2017

(51) Int. Cl.
| G06F 15/16 | (2006.01) |
| H04L 29/08 | (2006.01) |
| G06F 13/10 | (2006.01) |
| H04W 4/80  | (2018.01) |
| H04W 76/14 | (2018.01) |
| H04W 84/12 | (2009.01) |

(52) U.S. Cl.
CPC .......... *H04L 67/148* (2013.01); *G06F 13/102* (2013.01); *H04W 4/80* (2018.02); *H04W 76/14* (2018.02); *H04W 84/12* (2013.01)

(58) Field of Classification Search
CPC ...................................................... H04L 12/12

USPC ........................................ 709/228; 455/41.2
See application file for complete search history.

(56) References Cited

U.S. PATENT DOCUMENTS

| 9,429,992    | B1* | 8/2016  | Ashenbrenner ..... G06F 13/4081 |
| 2010/0254370 | A1* | 10/2010 | Jana ..................... H04L 65/1016 370/352 |
| 2011/0047280 | A1* | 2/2011  | Eom ..................... H04L 67/148 709/228 |
| 2012/0131377 | A1* | 5/2012  | Baird ................... G06F 11/1479 714/4.11 |
| 2014/0359709 | A1* | 12/2014 | Nassar ................ H04L 65/1083 726/4 |
| 2015/0201440 | A1* | 7/2015  | Gao ......................... H04B 5/02 455/41.2 |
| 2015/0350339 | A1* | 12/2015 | Lee ..................... H04L 65/1016 709/227 |
| 2017/0273127 | A1* | 9/2017  | Glass .................. H04W 76/023 |

* cited by examiner

*Primary Examiner* — Hamza N Algibhah
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a control device. The control device determines that a first thin client is in a remote session with a remote machine and is in wireless connection with one or more peripherals. The control device detects that the first thin client is in a predetermined status. The control device requests a second thin client to resume the remote session of the remote machine. The control device connects the one or more peripherals with the second thin client wirelessly.

17 Claims, 8 Drawing Sheets

FAILOVER AND LIVE MIGRATION OF ZERO/THIN CLIENTS

BACKGROUND

Field

The present disclosure relates generally to networked computer systems, and more particularly, to techniques of failover and live migration of zero/thin clients in session with a remote machine.

Background

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

As a user's data and applications (known as the user's session) are predominantly located on the server, there is a need for effective thin client device session management, in order to enable the user to reliably and securely access their session. Further, zero/thin client devices that are physically connected to Keyboard-Video-Mouse (KVM) using cables can have downtime issues. If a zero/thin client device fails or the device requires software/firmware/hardware upgrade, there may be a considerable downtime. The downtime can adversely impact the productivity and also interrupt current activities on that particular zero/thin client. Therefore, there is also a need to utilize wireless zero/thin client and peripherals provide high availability to zero/thin clients devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a control device. The control device determines that a first thin client is in a remote session with a remote machine and is in wireless connection with one or more peripherals. The control device detects that the first thin client is in a predetermined status. The control device requests a second thin client to resume the remote session of the remote machine. The control device connects the one or more peripherals with the second thin client wirelessly.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
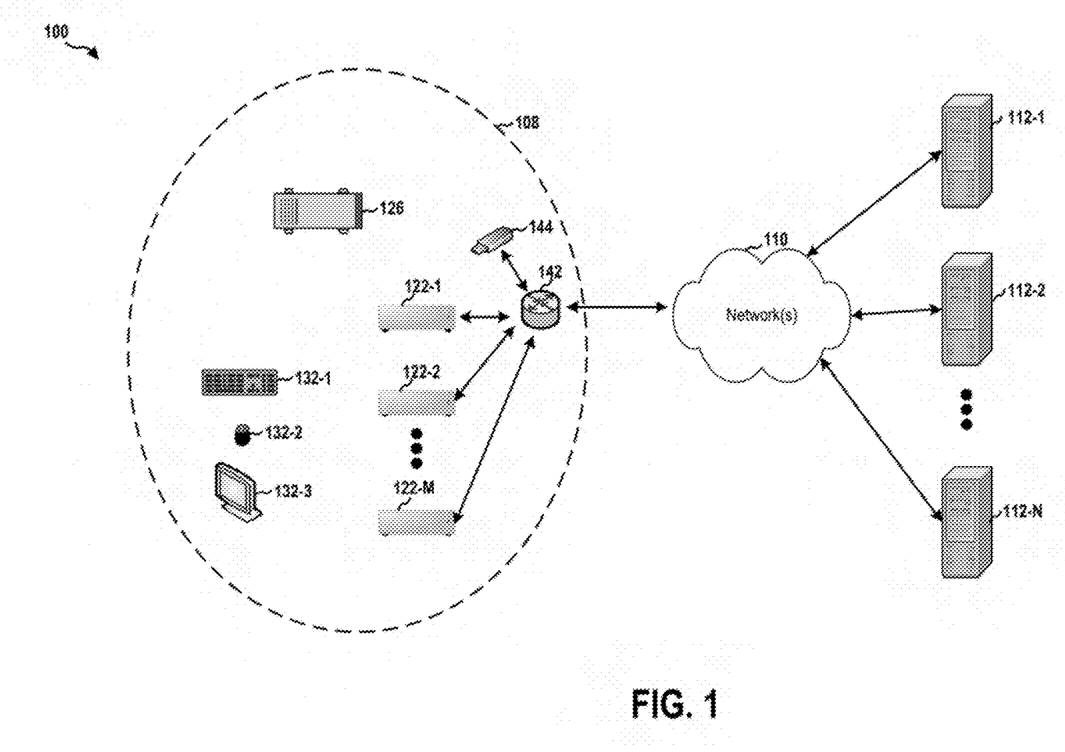
FIG. 1 is a diagram illustrating networked thin clients and remote machines.

FIG. 1 is a diagram 100 illustrating networked thin clients and remote machines. One or more of M thin clients 122-1, 122-2, . . . , 122-M each may be utilized to establish a respective session with one or more of N remote machines 112-1, 112-2, . . . , 112-N, M and N each being a respective integer greater than 0. In certain configurations, the thin clients 122-1, 122-2, . . . , 122-M may be in communication with the remote machines 112-1, 112-2, . . . , 112-N through a network 110 (e.g., Internet). Each of the remote machines 112-1, 112-2, . . . , 112-N may be a virtual machine or a physical machine. Each of the thin clients 122-1, 122-2, . . . , 122-M may be wirelessly connected with one or more peripherals, e.g., peripherals 132-1, 132-2, 132-3.

Further, a thin client manager 126 may be utilized to manage the thin clients 122-1, 122-2, . . . , 122-M, the remote machines 112-1, 112-2, . . . , 112-N, and/or the peripherals 132-1, 132-2, 132-3. The networked peripherals, the thin client manager 126, and the thin clients 122-1, 122-2, . . . , 122-M may be in the same LAN 108, e.g., a wireless local area network (WLAN) or a wired LAN. In certain configurations, those devices may be in a different type of network.

Figure 2:
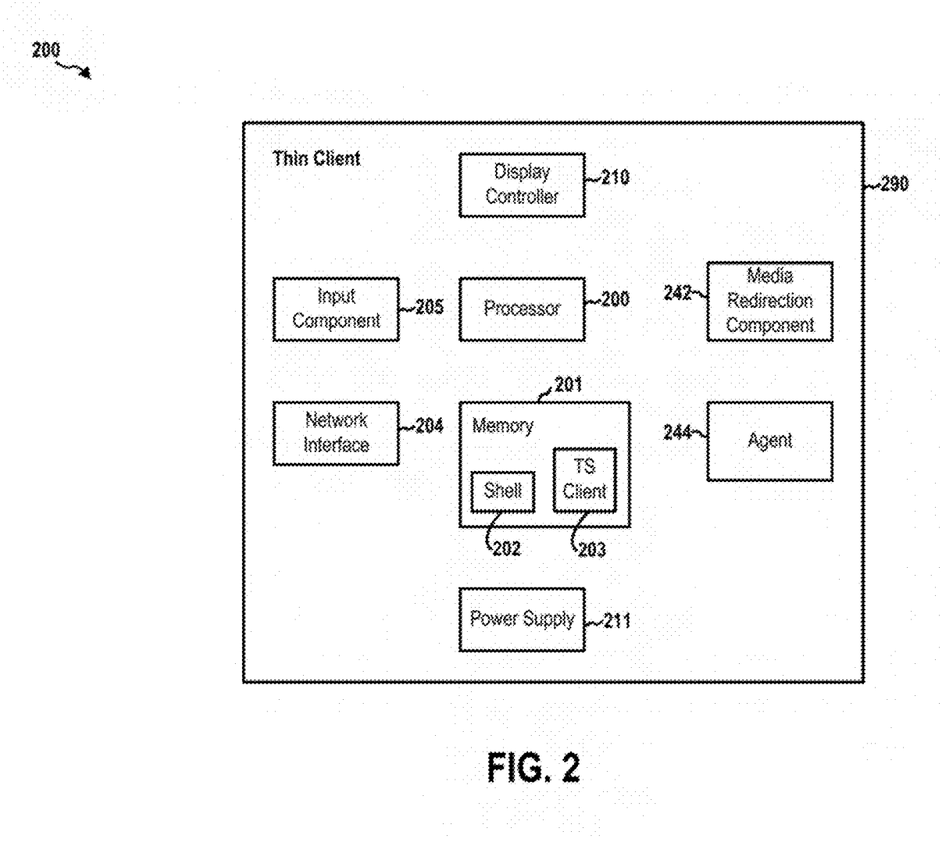
FIG. 2 is a diagram 200 illustrating an exemplary thin client.

FIG. 2 is a diagram 200 illustrating an exemplary thin client. A thin client 290, which may be each one of the thin clients 122-1, 122-2, . . . , 122-M, includes one or more processors 200, which can be microprocessors, controllers or any other suitable type of processors for processing computing executable instructions to control the operation of the device. The computer executable instructions can be provided using any computer-readable media, such as memory 201. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

The memory 201 is arranged to store software that is able to be executed on the processor 200. The memory 201 of the thin client device stores a software shell 202 and a terminal server (TS) client 203 application, the functionality of which is described in more detail infra.

A network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine, which is described supra in more detail. Further, the thin client 290 may also include an agent 244 that can be used to communicate with the thin client manager 126.

Figure 3:
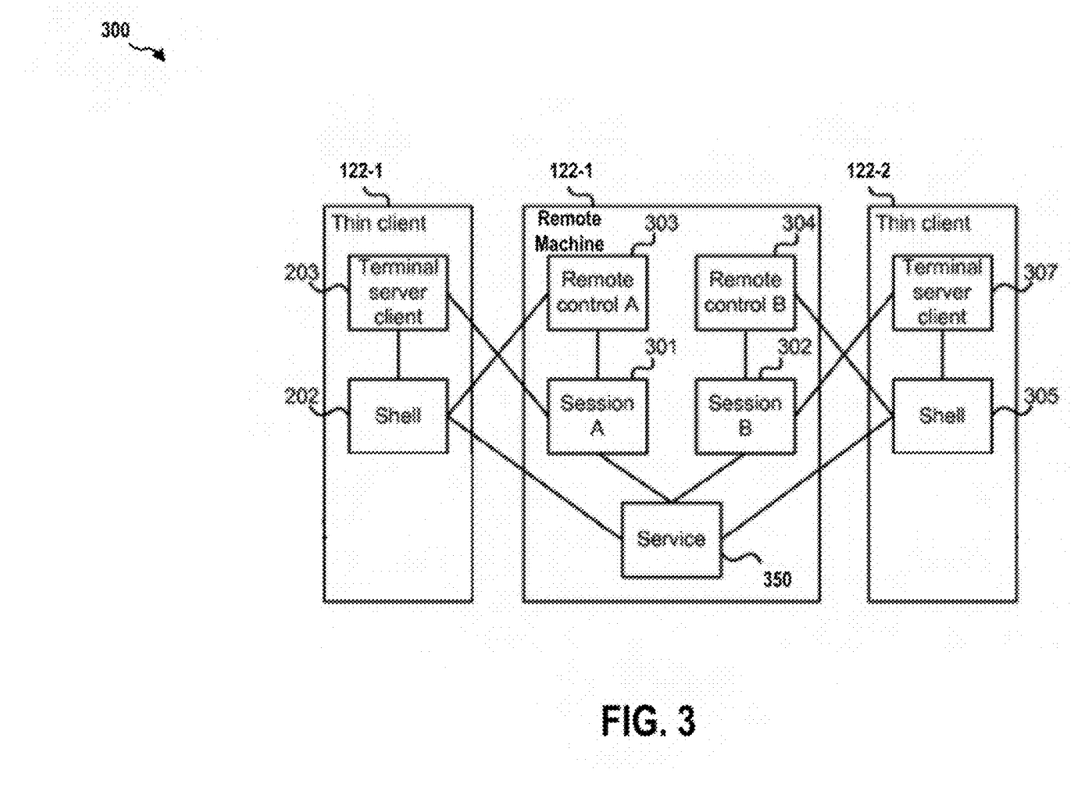
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, in stead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
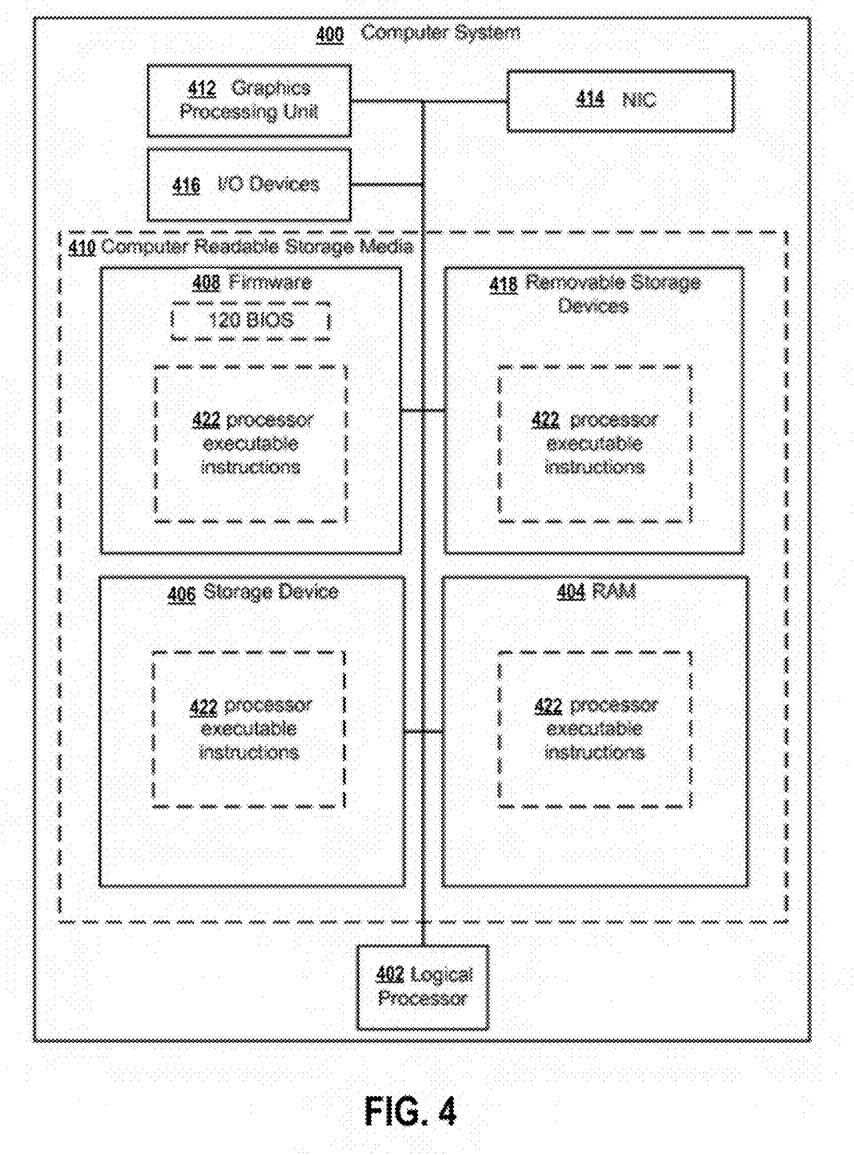
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide non volatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
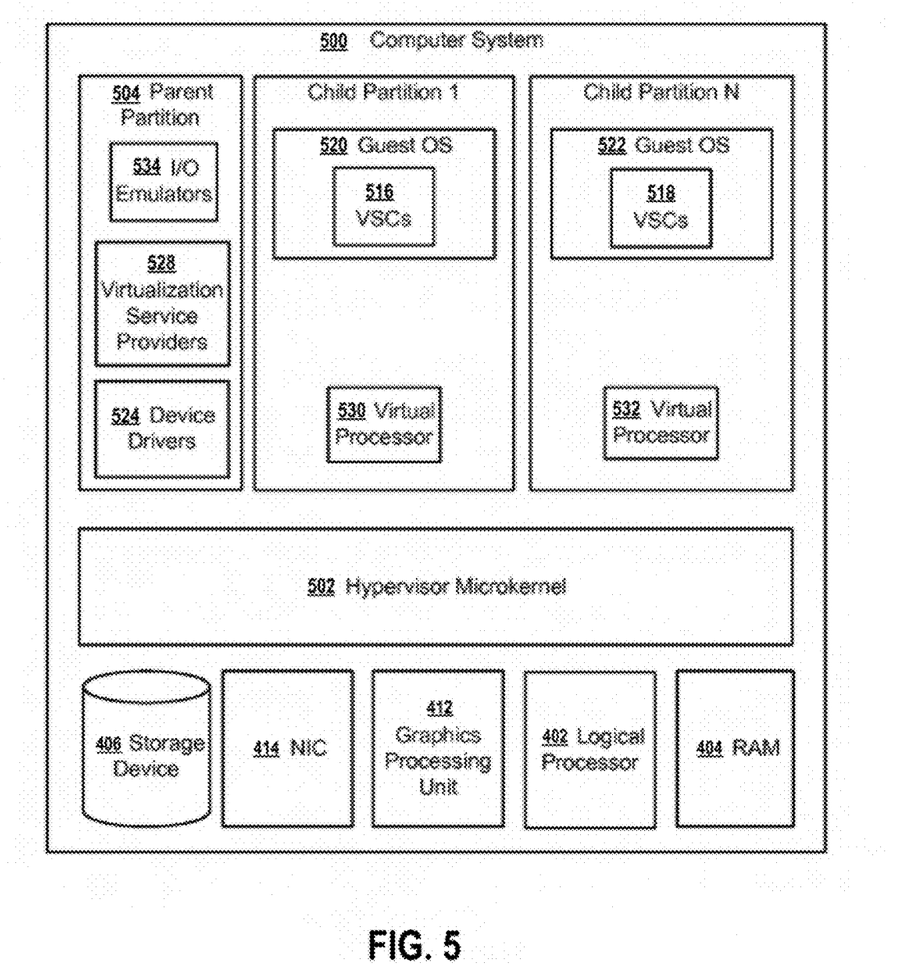
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of XEN's open source hypervisor is illustrated. Parent partition 504 in this operational environment can be configured to provide resources to guest operating systems executing in the child partitions 1-N by using virtualization service providers 528 (VSPs) that are typically referred to as back-end drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Referring back to FIG. 1, in this example, initially the thin client 122-1 may be wirelessly connected with peripherals 132-1, 132-2, 132-3, specifically, a keyboard 132-1, a mouse 132-2, and a display 132-3. The one or more peripherals may also include other type of peripherals such as a speaker, a gaming joystick, or an RF wireless peripheral.

In a first configuration, the thin client 122-1 (and each of the other ones of the thin clients 122-1, 122-2, . . . , 122-M) may be configured to discover the remote machines 112-1, 112-2, . . . , 112-N or may be configured with a list of the remote machines 112-1, 112-2, . . . , 112-N. Through discovery or configuration, the thin client manager 126 may obtain information regarding the specifications and capabilities of the remote machines 112-1, 112-2, . . . , 112-N. The thin client 122-1 may select, e.g., under the instructions of a user, to establish a remote session with the remote machine 112-1 (or another one of the remote machines 112-1, 112-2, . . . , 112-N). The thin client 122-1 may have certain requirements for a remote machine to be used, e.g., a remote machine supporting graphic intensive operations. The thin client 122-1 may select one suitable remote machine based on the specifications and capabilities of the remote machines 112-1, 112-2, . . . , 112-N.

To establish a remote session with the remote machine 112-1, the thin client 122-1 may send a request to the remote machine 112-1 in accordance with a remote session protocol such as RDP or VNC. The request may include credentials of the user such as a username, a password, and/or a domain name. After receiving the request, the remote machine 112-1 may check authentication and authorization of the user. When the user is authenticated and authorized, the remote machine 112-1 may communicate with the thin client 122-1 to establish a remote session.

Upon establishing the remote session successfully with the remote machine 112-1, the thin client 122-1 may report to the thin client manager 126 regarding the identity of the remote machine 112-1.

In a second configuration, the thin client 122-1 may request, e.g., under the instructions of a user, the thin client manager 126 to select one of the remote machines 112-1, 112-2, . . . , 112-N for the thin client 122-1. The thin client 122-1 may optionally send requirements with respect to the remote machine, e.g., a remote machine supporting graphic intensive operations, to the thin client manager 126. The thin client manager 126 may have information regarding the specifications and capabilities of the remote machines 112-1, 112-2, . . . , 112-N. Thus, the thin client manager 126 may select one remote machine that is suitable for the thin client 122-1. In addition or alternatively, the thin client manager 126 may select a remote machine for the thin client 122-1 based on a predetermined rule, such as a random selection rule or a round robin rule. The thin client manager 126 sends the identity of the selected thin client (in this example, the remote machine 112-1) to the thin client 122-1.

After learning the identity of the assigned remote machine (e.g., the remote machine 112-1) by the thin client manager 126, similarly to what was described supra, the thin client 122-1 may request to establish a remote session with the assigned remote machine. In this example, the thin client 122-1 establishes a remote session with the remote machine 112-1.

In both the first and the second configurations, after establishing the remote session with the remote machine 112-1, the thin client 122-1 may report remote session information to the thin client manager 126. The remote session information may include the credentials (e.g., the username, the password, and/or the domain name) used to establish the remote session. The remote session information may also include other remote machine specific information such as display settings (e.g., number of monitors and resolution of each monitor) of the remote session. The thin client manager 126 accordingly keeps a record of the reported remote session information received from the thin client 122-1 or any other thin clients.

As described supra, initially, the thin client 122-1 may be wirelessly connected with the peripherals 132-1, 132-2, 132-3. In particular, in this example, the thin client 122-1 may be wirelessly connected with the keyboard 132-1 and the mouse 132-2 in accordance with BLUETOOTH protocol. The thin clients 122-1, 122-2, . . . , 122-M and the display 132-3 may be in the same LAN 108. The thin client 122-1 may request the display 132-3 be dedicated for use by the thin client 122-1. In particular, the LAN 108 may be a WLAN and the display 132-3 may be able to receive display signals wirelessly through the LAN 108. The thin client 122-1 may send image frame packets to the display 132-3 based on the network address (e.g., IP address or MAC address) of the display 132-3. As such, the display 132-3 may display the image frames of the thin client 122-1.

In this example, after the thin client 122-1 is wirelessly connected with the peripherals 132-1, 132-2, 132-3, the thin client 122-1 reports device information of the peripherals 132-1, 132-2, 132-3 to the thin client manager 126. As described supra, in this example, the keyboard 132-1 and the mouse 132-2 may be BLUETOOTH devices. Accordingly, the device information may include BLUETOOTH unique identifiers for the keyboard 132-1 and the mouse 132-2. Further, the display 132-3 may be a WLAN display. The device information may include a network address (e.g., IP address or MAC address) of the display 132-3 in the WLAN. In another example, the peripherals may be connected with the thin client 122-1 via other protocols. The thin client 122-1 may report the device information according to those protocols to the thin client manager 126. For example, the device information may include a radio frequency (RF) wireless unique identifier for a RF wireless peripheral of the peripherals. In general, the device information can be used by a thin client to reestablish wireless connections (or pairing) with the peripherals.

In certain configurations, the peripherals 132-1, 132-2, 132-3 may be initially paired with each of the thin clients 122-1, 122-2, . . . , 122-M one after another. Each thin client may store necessary information of the peripherals 132-1, 132-2, 132-3 such that a subsequent reconnection with the peripherals 132-1, 132-2, 132-3 may be automatic without user confirmation or input.

In certain configurations, a thin client may be connected to a media device and redirected the media device to a remote machine. In this example, a network router 142 in the LAN 108 is connected with a media device 144 and provides devices (including the thin clients 122-1, 122-2, . . . , 122-M) in the LAN 108 access to the media device 144. In particular, the LAN 108 may be a WLAN and the network router 142 may be a wireless router. The thin client 122-1, e.g., under the instructions of the user, may redirect the media device 144 to the remote machine 112-1. That is, under media redirection, the remote machine 112-1 may perceive the media device 144 as a media device connected to the remote machine 112-1. The media device 144 may include at least one of a mass storage device, an audio device, a printer, a scanner, and a smart card. The thin client 122-1 may send to the thin client manager 126 information regarding the media redirection session between the thin client 122-1 and the remote machine 112-1. The media redirection session information may indicate the specification, identity, and/or network address of the media being redirected as well as how the media is used at the remote machine 112-1.

In this example, as described supra, a user may utilize the peripherals 132-1, 132-2, 132-3 to access the thin client 122-1. As such, the user may provide input to the remote machine 112-1 and may operate the remote machine 112-1 through the thin client 122-1. During use, the thin client 122-1 (and similarly any other thin client) may periodically provide to the thin client manager 126 status information (e.g., device health information or operating condition). In addition or alternatively, the thin client manager 126 may poll each of the thin clients 122-1, 122-2, . . . , 122-M regarding their statuses, and the thin clients 122-1, 122-2, . . . , 122-M may accordingly respond. As such, in this example, the thin client manager 126 may obtain status information from the thin client 122-1. The status information may indicate that the thin client 122-1 is in a working status, a non-working status, a preparation for maintenance status, etc. In addition, when the thin client manager 126 is not able to get a status information from the thin client 122-1 (e.g., when the thin client 122-1 is malfunctioning), the thin client manager 126 may deem that the thin client 122-1 is in a non-working status.

When the thin client manager 126 detects that the thin client 122-1 is in a non-working status, a preparation for maintenance status, or other selected statuses, the thin client manager 126 may determine that the thin client 122-1 may not be able to continuously participate, or is not in, the session established with the remote machine 112-1. The thin client manager 126 may select another thin client to replace the thin client 122-1 in the remote session, and connect the peripherals that are currently connected with the thin client 122-1 (e.g., the peripherals 132-1, 132-2, 132-3) with the replacement thin client. As such, the user may use the same peripherals to continuously operate the remote machine 112-1, although via different thin clients.

The thin client manager 126 may select a working, replacement thin client that matches the specifications and capabilities of the thin client 122-1 or based on other rules. In this example, the thin client manager 126 selects the thin client 122-2 as the replacement thin client. Subsequently, the thin client manager 126 may send to the thin client 122-2 the remote session information of the remote session established between the thin client 122-1 and the remote machine 112-1 as well as the device information of the peripherals 132-1, 132-2, 132-3. By doing so, the thin client manager 126 requests that the thin client 122-2 resume the remote session of the remote machine 112-1 that was established with the thin client 122-1 and connect (pair) with the peripherals 132-1, 132-2, 132-3.

Upon receiving from the thin client manager 126 the remote session information and the device information described supra, the thin client 122-2 sends to the remote machine 112-1 a request in accordance with the remote session protocol indicated in the remote session information. The request may include the credentials used by the thin client 122-1 to establish the remote session with the remote machine 112-1. Based on those credentials, the remote machine 112-1 may allow the thin client 122-2 to resume the same remote session.

Further, the thin client 122-2 may send connection/pairing request to the peripherals indicated in the device information (e.g., the peripherals 132-1, 132-2, 132-3). The peripherals may accept, optionally in certain circumstances under the authorization of the user, the requests and complete the connection/pairing with the peripherals 132-1, 132-2, 132-3. As such, the user, using the same peripherals, is transitioned from the thin client 122-1 to the thin client 122-2 for accessing and operating the same remote session of the same remote machine (i.e., the remote machine 112-1).

The thin client manager 126 may further determine whether the thin client 122-1 was redirecting a media to the remote machine 112-1. In this example, based on the media redirection session information received from the thin client 122-1, the thin client manager 126 can determine that the thin client 122-1 is redirecting the media device 144 to the remote machine 112-1. The thin client manager 126 sends the media redirection session information to the thin client 122-2. Upon receiving the information, the thin client 122-2 may request connection with the media device 144, e.g., based on the network address and identity of the media device 144 indicated by the media redirection session information. Subsequently, the thin client 122-2 may redirect the media device 144 to the remote machine 112-1 in accordance with how the media device 144 is used at the remote machine 112-1 as indicated in the media redirection session information. As such, the thin client 122-2 redirects the media device 144 to the remote machine 112-1.

Figure 6:
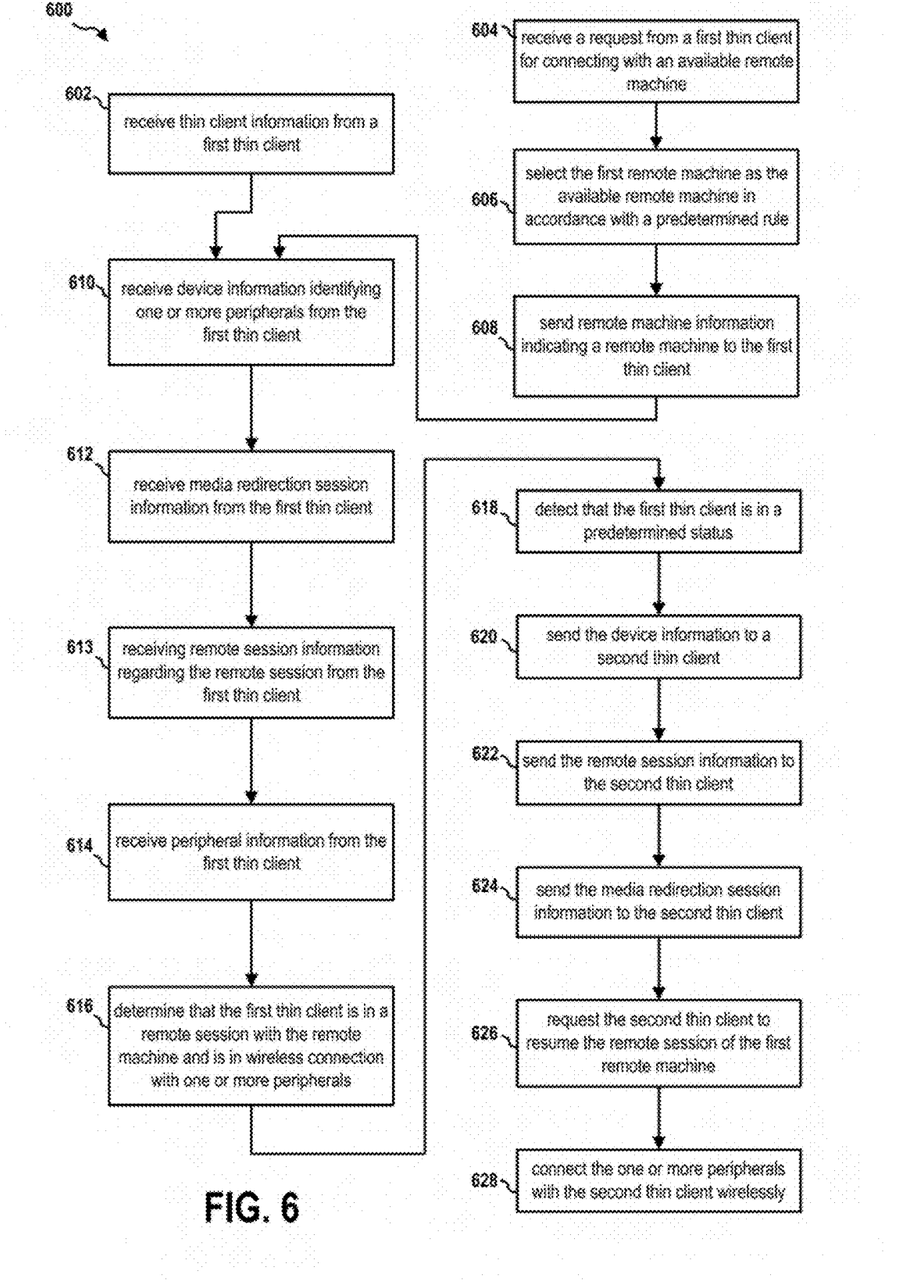
FIG. 6 is a flow chart of a method (process) for managing thin clients.

FIG. 6 is a flow chart 600 of a method (process) for managing thin clients. The method may be performed by a control device (e.g., the thin client manager 126 and the apparatus 702/702'). In certain configurations, at operation 602, the control device receives thin client information from a first thin client. The thin client information indicates that the first thin client is in the remote session with a remote machine and is in wireless connection with one or more peripherals. Then the control device enters operation 610. In certain configurations, the remote machine is a virtual machine. In certain configurations, the remote machine is a physical machine. In certain configurations, the one or more peripherals include at least one of a mouse, a keyboard, and a display.

In certain configurations, at operation 604, the control device receives a request from the first thin client for connecting with an available remote machine. At operation 606, the control device selects the remote machine as the available remote machine in accordance with a predetermined rule. At operation 608, the control device sends remote machine information indicating the remote machine to the first thin client. Then the control device enters operation 610.

In certain configurations, at operation 610, the control device receives device information identifying the one or more peripherals from the first thin client. In certain configurations, the device information includes a BLUETOOTH unique identifier for a BLUETOOTH peripheral of the one or more peripherals. In certain configurations, the device information includes a network address for a wireless local area network (WLAN) peripheral of the one or more peripherals. In certain configurations, the device information includes a radio frequency (RF) wireless unique identifier for a RF wireless peripheral of the one or more peripherals.

In certain configurations, the one or more peripherals include a media device. At operation 612, the control device receives media redirection session information from the first thin client. The media redirection session information indicating that the first thin client is redirecting the media device to the remote machine. In certain configurations, the media device includes at least one of a mass storage device, an audio device, a printer, a scanner, and a smart card.

In certain configurations, at operation 613, the control device receives remote session information regarding the remote session from the first thin client. In certain configurations, the remote session information includes an identification of the remote machine and a credential used by the first thin client to establish the remote session. In certain configurations, the remote session information includes display settings used by the remote machine in the remote session.

In certain configurations, at operation 614, the control device receives peripheral information from the first thin client. The peripheral information indicates that the first thin client is in wireless connection with the one or more peripherals. The determining that the first thin client is in wireless connection with the one or more peripherals is based on the peripheral information.

At operation 616, the control device determines that the first thin client is in a remote session with the remote machine and is in wireless connection with one or more peripherals. In certain configurations, the determining is based on the thin client information of operation 602. In certain configurations, the determining is based on the selection of operation 606.

At operation 618, the control device detects that the first thin client is in a predetermined status. In certain configurations, the predetermined status is a non-working status or a preparation for maintenance status. In certain configurations, prior to the detecting that the first thin client is in a predetermined status, the one or more peripherals were wirelessly connected with and then disconnected from a second thin client to establish automatic reconnection.

In certain configurations, at operation 620, the control device sends the device information to the second thin client. In certain configurations, at operation 622, the control device sends the remote session information to the second thin client. In certain configurations, at operation 624, the control device sends the media redirection session information to the second thin client.

At operation 626, the control device requests the second thin client to resume the remote session of the remote machine. In certain configurations, the second thin client is requested to resume the remote session based on the remote session information of operation 622.

At operation 628, the control device connects the one or more peripherals with the second thin client wirelessly. In certain configurations, the second thin client and the one or more peripherals are connected based on the device information of operation 620.

Figure 7:
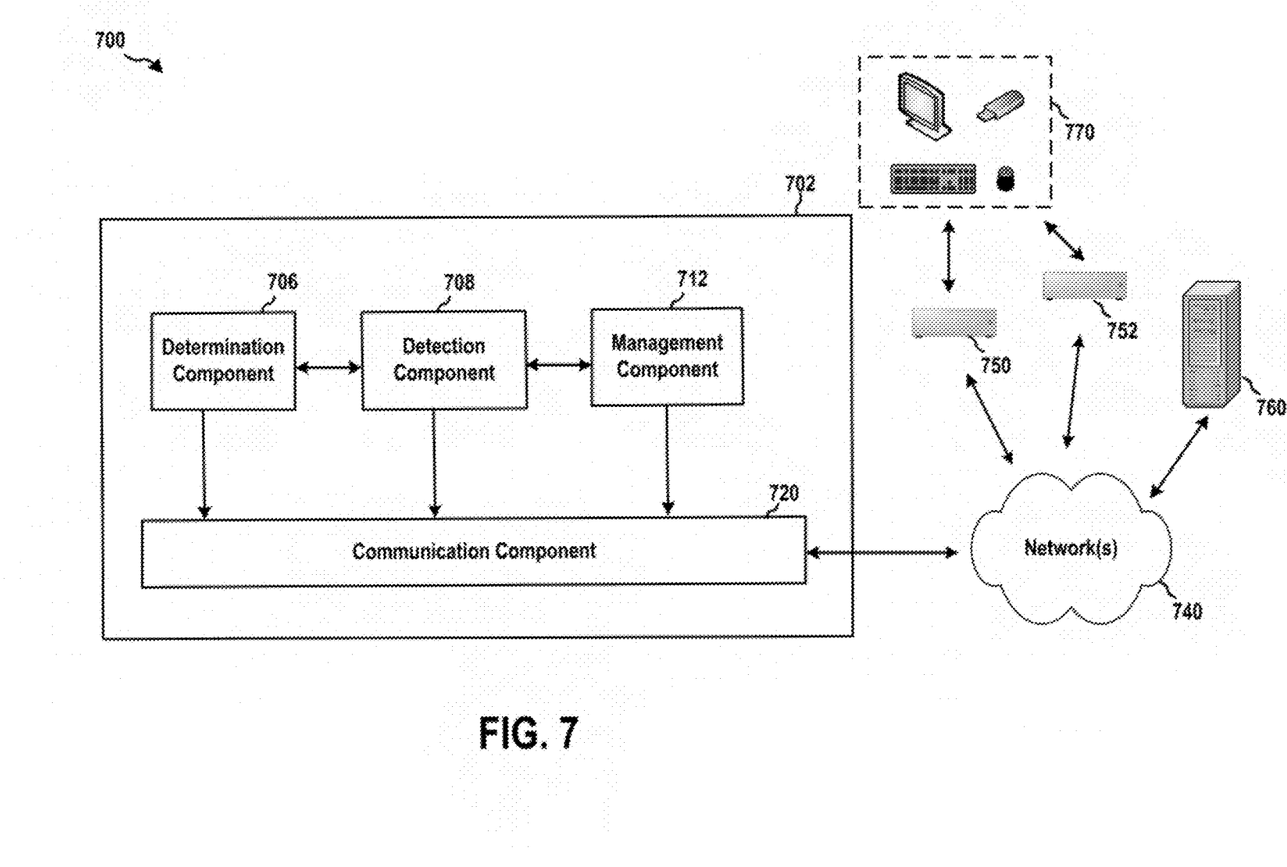
FIG. 7 is a conceptual data flow diagram illustrating the data flow between different means/components in an exemplary apparatus.

FIG. 7 is a conceptual data flow diagram 700 illustrating the data flow between different components/means in an exemplary apparatus 702. The apparatus 702 may a control device (e.g., the thin client manager 126). The apparatus 702 includes, among other components, a determination component 706, a detection component 708, a management component 712, and a communication component 720. The apparatus 702 may be in communication with, through one or more networks 740, a first thin client 750, a second thin client 752, and a remote machine 760.

In certain configurations, the communication component 720 receives thin client information from the first thin client 750. The thin client information indicates that the first thin client 750 is in the remote session with the remote machine 760 and is in wireless connection with one or more peripherals 770. In certain configurations, the remote machine 760 is a virtual machine. In certain configurations, the remote machine 760 is a physical machine. In certain configurations, the one or more peripherals 770 include at least one of a mouse, a keyboard, and a display.

In certain configurations, the communication component 720 receives a request from the first thin client 750 for connecting with an available remote machine. The management component 712 selects the remote machine 760 as the available remote machine in accordance with a predetermined rule. The communication component 720 sends remote machine information indicating the remote machine 760 to the first thin client 750.

In certain configurations, the communication component 720 receives device information identifying the one or more peripherals 770 from the first thin client 750. In certain configurations, the device information includes a BLUETOOTH unique identifier for a BLUETOOTH peripheral of the one or more peripherals 770. In certain configurations, the device information includes a network address for a wireless local area network (WLAN) peripheral of the one or more peripherals 770. In certain configurations, the device information includes a radio frequency (RF) wireless unique identifier for a RF wireless peripheral of the one or more peripherals 770.

In certain configurations, the one or more peripherals 770 include a media device. The communication component 720 receives media redirection session information from the first thin client 750. The media redirection session information indicating that the first thin client 750 is redirecting the media device to the remote machine 760. In certain configurations, the media device includes at least one of a mass storage device, an audio device, a printer, a scanner, and a smart card.

In certain configurations, the communication component 720 receives remote session information regarding the remote session from the first thin client 750. In certain configurations, the remote session information includes an identification of the remote machine 760 and a credential used by the first thin client 750 to establish the remote session. In certain configurations, the remote session information includes display settings used by the remote machine 760 in the remote session.

In certain configurations, the communication component 720 receives peripheral information from the first thin client 750. The peripheral information indicates that the first thin client 750 is in wireless connection with the one or more peripherals. The determining that the first thin client 750 is in wireless connection with the one or more peripherals is based on the peripheral information.

The determination component 706 determines that the first thin client 750 is in a remote session with the remote machine 760 and is in wireless connection with one or more peripherals. In certain configurations, the determining is based on the thin client information received from the first thin client 750. In certain configurations, the determining based on the selection of the management component 712.

The detection component 708 detects that the first thin client 750 is in a predetermined status. In certain configurations, the predetermined status is a non-working status or a preparation for maintenance status. In certain configurations, prior to the detecting that the first thin client 750 is in a predetermined status, the one or more peripherals 770 were wirelessly connected with and then disconnected from a second thin client 752 to establish automatic reconnection.

In certain configurations, the communication component 720 sends the device information to the second thin client 752. In certain configurations, the communication component 720 sends the remote session information to the second thin client 752. In certain configurations, the communication component 720 sends the media redirection session information to the second thin client 752.

The communication component 720 requests the second thin client 752 to resume the remote session of the remote machine 760. In certain configurations, the second thin client 752 is requested to resume the remote session based on the remote session information sent by the apparatus 702.

The management component 712 connects the one or more peripherals 770 with the second thin client 752 wirelessly. In certain configurations, the second thin client 752 and the one or more peripherals 770 are connected based on the device information sent by the apparatus 702.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
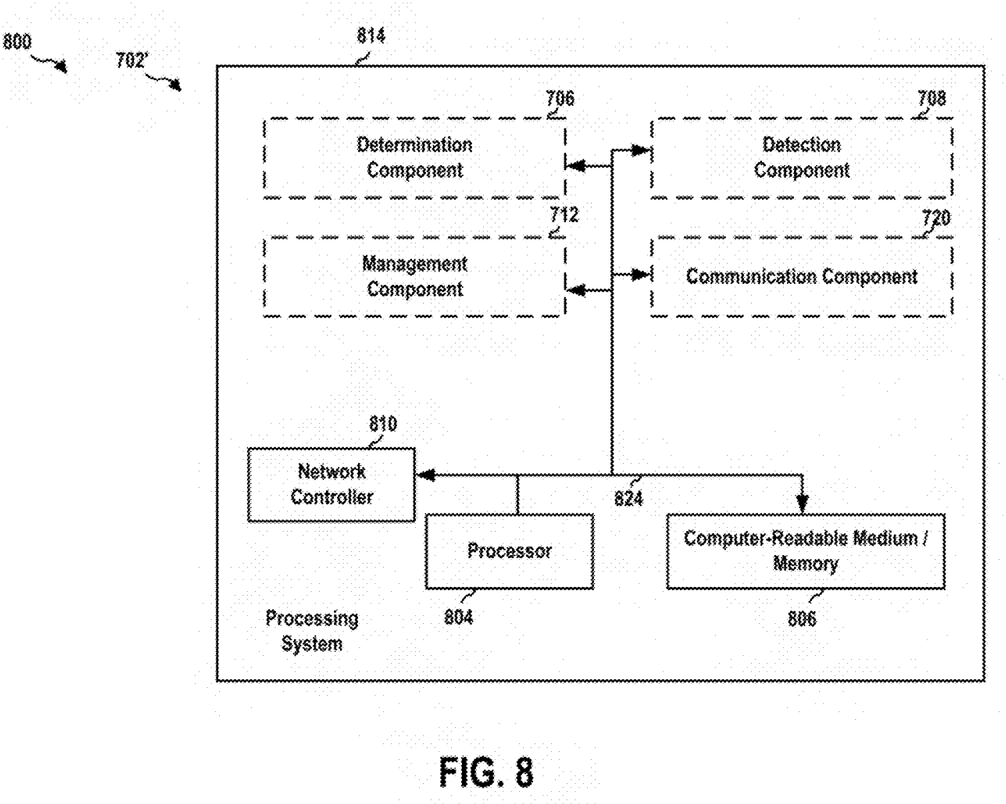
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 706, 708, 712, 720, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a network controller 810. The network controller 810 provides a means for communicating with various other apparatus over a network. The network controller 810 receives a signal from the network, extracts information from the received signal, and provides the extracted information to the processing system 814, specifically the communication component 720. In addition, the network controller 810 receives information from the processing system 814, specifically the communication component 720, and based on the received information, generates a signal to be sent to the network. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the components 706, 708, 712, 720. The components may be software components running in the processor 804, resident/stored in the computer readable medium/memory 806, one or more hardware components coupled to the processor 804, or some combination thereof.

The apparatus 702/702' may be configured to include means for performing each of the operations described supra referring to FIG. 6. The aforementioned means may be one or more of the aforementioned components of the apparatus 702 and/or the processing system 814 of the apparatus 702' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client manager, comprising:
   determining that a first thin client device is in a remote session with a remote machine through a network and is in wireless connection with one or more peripherals comprising at least one of a keyboard, a mouse and a display;
   disconnecting the one or more peripherals that are wirelessly connected with a second thin client device from the second thin client device to establish automatic reconnection;
   after disconnecting the one or more peripherals from the second thin client device, detecting, by the thin client manager, that the first thin client device is in a predetermined status that the first thin client device is not able to continuously participate in the remote session established with the remote machine;
   requesting the second thin client device to resume the remote session of the remote machine; and
   connecting the one or more peripherals with the second thin client device wirelessly based on device information of the one or more peripherals so that the one or more peripherals continuously operate the remote machine through the second thin client, wherein the device information comprises a network address for a wireless local area network (WLAN) peripheral of the one or more peripherals.

2. The method of claim 1, wherein the remote machine is a virtual machine.

3. The method of claim 1, wherein the remote machine is a physical machine.

4. The method of claim 1, wherein the predetermined status is a non-working status or a preparation for maintenance status.

5. The method of claim 1, further comprising:
   receiving the device information identifying the one or more peripherals from the first thin client device, wherein the connecting the one or more peripherals with the second thin client device includes:
   sending the device information to the second thin client device, wherein the second thin client device and the one or more peripherals are connected based on the device information.

6. The method of claim 5, wherein the device information includes a BLUETOOTH unique identifier for a BLUETOOTH peripheral of the one or more peripherals.

7. The method of claim 5, wherein the device information includes a radio frequency (RF) wireless unique identifier for a RF wireless peripheral of the one or more peripherals.

8. The method of claim 1, further comprising:
   receiving remote session information regarding the remote session from the first thin client device; and
   sending the remote session information to the second thin client device, wherein the second thin client device is requested to resume the remote session based on the remote session information.

9. The method of claim 8, wherein the remote session information includes an identification of the remote machine and a credential used by the first thin client device to establish the remote session.

10. The method of claim 8, wherein the remote session information includes display settings used by the remote machine in the remote session.

11. The method of claim 1, wherein the one or more peripherals include a media device, the method further comprising:
    receiving media redirection session information from the first thin client, the media redirection session information indicating that the first thin client is redirecting the media device to the remote machine, wherein the connecting the one or more peripherals with the second thin client includes:
    sending the media redirection session information to the second thin client.

12. The method of claim 11, wherein the media device includes at least one of a mass storage device, an audio device, a printer, a scanner, and a smart card.

13. The method of claim 1, further comprising:
receiving peripheral information from the first thin client device, the peripheral information indicating that the first thin client device is in wireless connection with the one or more peripherals, wherein the determining that the first thin client is in wireless connection with the one or more peripherals is based on the peripheral information.

14. The method of claim 1, further comprising:
receiving thin client information from the first thin client device, the thin client information indicating that the first thin client device is in the remote session with the remote machine and is in wireless connection with the one or more peripherals, wherein the determining is based on the thin client information.

15. The method of claim 1, further comprising:
receiving a request from the first thin client device for connecting with an available remote machine;
selecting the remote machine as the available remote machine in accordance with a predetermined rule; and
sending remote machine information indicating the remote machine to the first thin client device, wherein the determining that a first thin client device is in the remote session with the remote machine is based on the selection.

16. An apparatus for managing thin clients, comprising:
a memory; and
at least one processor coupled to the memory and configured to:
determine that a first thin client device is in a remote session with a remote machine through a network and is in wireless connection with one or more peripherals comprising at least one of a keyboard, a mouse and a display;
disconnect the one or more peripherals that are wirelessly connected with a second thin client device from the second thin client device to establish automatic reconnection;
after disconnecting the one or more peripherals from the second thin client device, detect that the first thin client device is in a predetermined status that the first thin client device is not able to continuously participate in the remote session established with the remote machine;
request the second thin client device to resume the remote session of the remote machine; and
connect the one or more peripherals with the second thin client device wirelessly based on device information of the one or more peripherals so that the one or more peripherals continuously operate the remote machine through the second thin client device, wherein the device information comprises a network address for a wireless local area network (WLAN) peripheral of the one or more peripherals.

17. A non-transitory computer-readable medium storing computer executable code for managing thin clients, comprising code to:
determine that a first thin client device is in a remote session with a remote machine and is in wireless connection with one or more peripherals;
disconnect the one or more peripherals that are wirelessly connected with a second thin client device from the second thin client device to establish automatic reconnection;
detect that the first thin client device is in a predetermined status that the first thin client is not able to continuously participate in the remote session established with the remote machine;
request the second thin client to resume the remote session of the remote machine; and
connect the one or more peripherals with the second thin client device wirelessly based on device information of the one or more peripherals so that the one or more peripherals continuously operate the remote machine through the second thin client, wherein the device information comprises a network address for a wireless local area network (WLAN) peripheral of the one or more peripherals.

* * * * *